(12) United States Patent
Kawasaki et al.

(10) Patent No.: US 12,187,089 B2
(45) Date of Patent: Jan. 7, 2025

(54) CONTROL DEVICE, VEHICLE, ESTIMATION METHOD, AND STORAGE MEDIUM

(71) Applicant: HONDA MOTOR CO., LTD., Tokyo (JP)

(72) Inventors: Yohei Kawasaki, Tokyo (JP); Yosuke Wada, Tokyo (JP); Shunichi Miyagishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 17/952,581

(22) Filed: Sep. 26, 2022

(65) Prior Publication Data
US 2023/0099836 A1  Mar. 30, 2023

(30) Foreign Application Priority Data
Sep. 29, 2021 (JP) .................... 2021-159673

(51) Int. Cl.
*B60G 17/016* (2006.01)
*B62K 25/04* (2006.01)

(52) U.S. Cl.
CPC .......... *B60G 17/0164* (2013.01); *B62K 25/04* (2013.01); *B60G 2300/12* (2013.01); *B60G 2400/102* (2013.01); *B60G 2400/106* (2013.01); *B62K 2025/044* (2013.01)

(58) Field of Classification Search
CPC ............ B60G 17/0164; B60G 2300/12; B60G 2400/102; B60G 2400/106; B62K 25/04; B62K 2025/044
USPC ................................................. 701/37
See application file for complete search history.

(56) References Cited

U.S. PATENT DOCUMENTS

| | | | |
|---|---|---|---|
| 5,500,798 | A | 3/1996 | Inagaki |
| 5,935,181 | A | 8/1999 | Iwasaki |
| 9,446,649 | B2 | 9/2016 | Kurita |
| 9,751,373 | B2 | 9/2017 | Kurita |
| 9,809,079 | B2 | 11/2017 | Nedachi et al. |
| 10,618,367 | B2 | 4/2020 | Awano |
| 2009/0037051 | A1 | 2/2009 | Shimizu et al. |

(Continued)

FOREIGN PATENT DOCUMENTS

| | | |
|---|---|---|
| EP | 3489048 A1 | 5/2019 |
| JP | H05-338577 A | 12/1993 |

(Continued)

OTHER PUBLICATIONS

Office Action dated Apr. 21, 2023, issued in counterpart JP application No. 2021-159673, with English translation. (8 pages).

*Primary Examiner* — Hung Q Nguyen
*Assistant Examiner* — Anthony Donald Taylor, Jr.
(74) *Attorney, Agent, or Firm* — WHDA, LLP

(57) ABSTRACT

The present invention provides a control device of a vehicle, comprising: a detector configured to detect acceleration in a front-and-rear direction generated in the vehicle; and an estimation unit configured to calculate a braking force of the entire vehicle and a pitch angle of the vehicle based on the acceleration detected by the detector, and estimate an amount of nose dive of the vehicle during braking of the vehicle based on the calculated braking force of the entire vehicle and the calculated pitch angle of the vehicle.

10 Claims, 4 Drawing Sheets

(56) References Cited

U.S. PATENT DOCUMENTS

| | | |
|---|---|---|
| 2015/0239317 A1 | 8/2015 | Kurita |
| 2016/0272034 A1 | 9/2016 | Nedachi et al. |
| 2017/0080769 A1 | 3/2017 | Kurita |
| 2018/0154729 A1* | 6/2018 | Awano .................. B62K 25/04 |

FOREIGN PATENT DOCUMENTS

| | | | | |
|---|---|---|---|---|
| JP | H07-81357 A | | 3/1995 | |
| JP | H08-002234 A | | 1/1996 | |
| JP | H09-020120 A | | 1/1997 | |
| JP | 2007283839 A | * | 11/2007 | ........... B60G 17/015 |
| JP | 2009-035218 A | | 2/2009 | |
| JP | 2014-080184 A | | 5/2014 | |
| JP | 2015-205645 A | | 11/2015 | |
| JP | 2016-175466 A | | 10/2016 | |
| JP | 2017-30577 A | | 2/2017 | |
| JP | 2019-151124 A | | 9/2019 | |

\* cited by examiner

CONTROL DEVICE, VEHICLE, ESTIMATION METHOD, AND STORAGE MEDIUM

CROSS-REFERENCE TO RELATED APPLICATION(S)

This application claims priority to and the benefit of Japanese Patent Application No. 2021-159673 filed on Sep. 29, 2021, the entire disclosure of which is incorporated herein by reference.

BACKGROUND OF THE INVENTION

Field of the Invention

The present invention relates to a control device, a vehicle, an estimation method, and a storage medium.

Description of the Related Art

Japanese Patent Laid-Open No. 2019-151124 discloses a suspension device that adjusts the damping force at the lower limit of the damping portion in skyhook control.

If the amount of nose dive of a vehicle can be identified, the attitude of the vehicle can be controlled based on the amount of nose dive to improve the ride comfort of the vehicle. However, if a sensor that detects the amount of suspension stroke of a vehicle is used to identify the amount of nose dive of the vehicle, it can be disadvantageous in terms of vehicle cost.

SUMMARY OF THE INVENTION

The present invention provides, for example, a technique that can identify the amount of nose dive of a vehicle without using a sensor to detect the amount of suspension stroke of the vehicle.

According to one aspect of the present invention, there is provided a control device of a vehicle, comprising: a detector configured to detect acceleration in a front-and-rear direction generated in the vehicle; and an estimation unit configured to calculate a braking force of the entire vehicle and a pitch angle of the vehicle based on the acceleration detected by the detector, and estimate an amount of nose dive of the vehicle during braking of the vehicle based on the calculated braking force of the entire vehicle and the calculated pitch angle of the vehicle.

Further features of the present invention will become apparent from the following description of exemplary embodiments with reference to the attached drawings.

DESCRIPTION OF THE EMBODIMENTS

Figure 1:
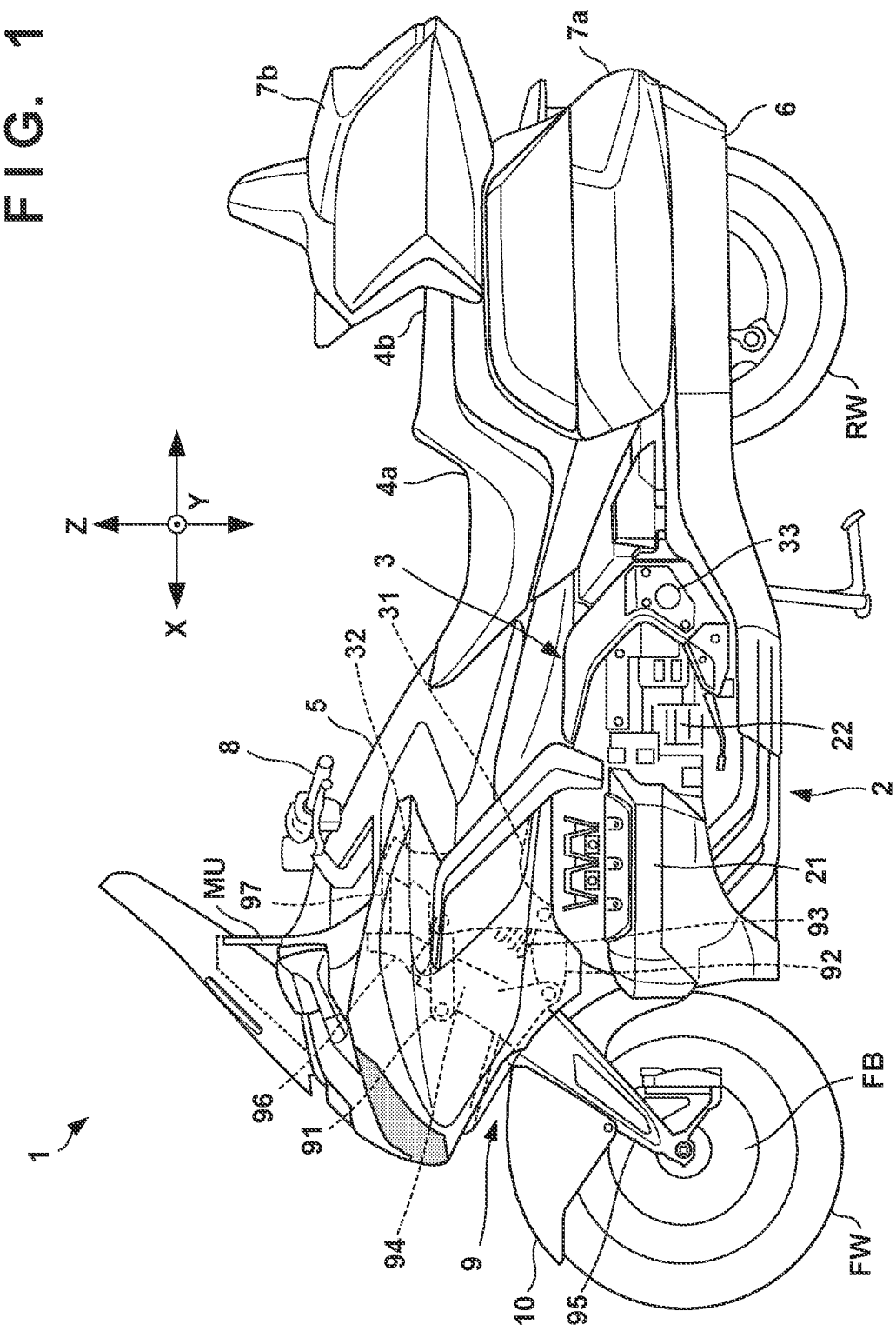
FIG. 1 is a side view of the left side of a straddle type vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Outline of Straddle Type Vehicle]

FIG. 1 is a left side view of a straddle type vehicle 1 according to an embodiment of the present invention. In FIG. 1, arrows X, Y, and Z indicate mutually orthogonal directions. The X direction indicates the front-and-rear direction of the straddle type vehicle 1 (motorcycle), the Y direction indicates the vehicle width direction of the straddle type vehicle 1 (left-and-right direction), and the Z direction indicates the up-and-down direction of the straddle type vehicle 1. An example of the application of the control device according to the present invention to the straddle type vehicle 1 is described below. The control device according to the present invention is applicable to various types of straddle type vehicles and four-wheeled vehicles, and moving bodies including other types of motorcycles, and is also applicable to electric vehicles with motors as the drive source, in addition to vehicles with internal combustion engines as the drive source. Hereinafter, the straddle type vehicle 1 may be referred to as a vehicle 1.

The vehicle 1 includes a power unit 2 between a front wheel FW and a rear wheel RW. The power unit 2 includes an engine 21 and a transmission 22. A driving force of the transmission 22 is transmitted to the rear wheel RW via a drive shaft (not illustrated) to rotate the rear wheel RW.

The power unit 2 is supported by a vehicle body frame 3. The vehicle body frame 3 includes a pair of left and right main frames 31 extending in the X direction. A fuel tank 5 and an air cleaner box (not illustrated) are disposed above the main frames 31. A meter unit MU that displays various types of information to a rider is provided in front of the fuel tank 5.

At front side end portions of the main frames 31, a head pipe 32 that rotatably supports a swivel pin (not illustrated) rotated by a handlebar 8 is provided. At rear end portions of the main frames 31, a pair of left and right pivot plates 33 is provided. Lower end portions of the pivot plates 33 and front end portions of the main frames 31 are connected by a pair of left and right lower arms (not illustrated), and the power unit 2 is supported by the main frames 31 and the lower arms. At the rear end portions of the main frames 31, a pair of left and right seat rails extending rearward is provided, and the seat rails support a seat 4a on which a rider is seated, a seat 4b on which a passenger is seated, a rear trunk 7b, and others.

A front end portion of a rear swing arm (not illustrated) extending in the front-and-rear direction is swingably supported by the pivot plates 33. The rear swing arm is swingable in the up-and-down direction, and the rear wheel RW is supported at a rear end portion of the rear swing arm. On a lower side of the rear wheel RW, an exhaust muffler 6 that muffles exhaust of the engine 21 extends in the X direction. On upper sides of the rear wheel RW, left and right saddlebacks 7a are provided.

At the front end portions of the main frames 31, a front suspension mechanism 9 that swingably supports the front wheel FW is formed. The front suspension mechanism 9 includes an upper link 91, a lower link 92, a fork support 93, a vibration reduction mechanism (cushion unit) 94, and a pair of left and right front forks 95. In the front suspension mechanism 9, the upper link 91, lower link 92, fork support 93, and vibration reduction mechanism 94 constitute a support mechanism that supports the front forks 95 of the vehicle 1.

The upper link 91 and lower link 92 are disposed above and below the front end portions of the main frames 31, respectively. The rear end portions of the upper link 91 and lower link 92 are swingably connected to the front end portion of the main frames 31. The upper link 91 and lower link 92 are swingably connected to the fork support 93.

The fork support 93 has a tubular shape and is inclined rearward. A steering shaft 96 is supported by the fork support 93 so as to be rotatable about the axis. The steering shaft 96 includes a shaft portion (not illustrated) into which the fork support 93 is inserted. A bridge (not illustrated) is provided at a lower end portion of the steering shaft 96, and the pair of left and right front forks 95 are supported by the bridge. The front forks 95 rotatably support the front wheel FW and also supports the front brake FB. An upper end portion of the steering shaft 96 is connected to a swivel pin (not illustrated) rotated by the handlebar 8 via a link 97. An upper portion of the front wheel FW is covered with a fender 10, and the fender 10 is supported by the front fork 95.

Figure 2:
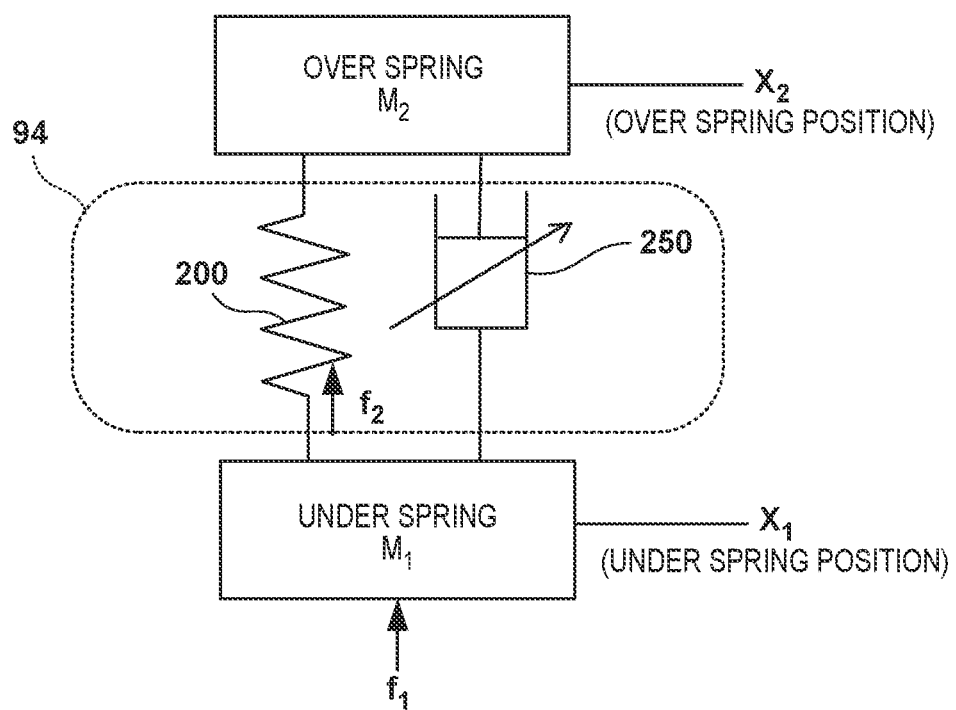
FIG. 2 is a diagram modeling a vibration reduction mechanism.

Next, the vibration reduction mechanism 94 is described. FIG. 2 is a diagram modeling the vibration reduction mechanism 94. The vibration reduction mechanism 94 is a mechanism for reducing vibrations transmitted from the road (ground) to the vehicle 1 (vehicle body) and has an elastic member 200 and a viscous damping member 250. As illustrated in FIG. 1, the vibration reduction mechanism 94 is swingably supported at its upper end portion by the main frames 31, and swingably supported at its lower end portion by the lower link 92.

In FIG. 2, the under spring mass M1 (unsprung mass, non-suspended mass) is the mass of the lower link 92 on which the lower end portion of the vibration reduction mechanism 94 is supported and the components connected to the lower link 92 (for example, front wheel FW and front brake FB). The over spring mass M2 (sprung mass, suspended mass) is the mass of the main frames 31, on which the upper portion of the vibration reduction mechanism 94 is supported, and the components connected to the main frames 31 (for example, vehicle body). A load f1 is a ground load (ground variable load) input to the vibration reduction mechanism 94 from the ground portion of the front wheel FW due to the rotation of the front wheel FW. A load f2 is the load (compression force) acting on the elastic member 200. A position X1 indicates the vertical position of the under spring mass M1 (under spring position) in the vibration reduction mechanism 94. A position X2 indicates the vertical position of the over spring mass M2 (over spring position) in the vibration reduction mechanism 94.

The elastic member 200 is a member having a spring constant. A spring or rubber is used as the elastic member 200, and a coil spring may be used in this embodiment. The viscous damping member 250 is, though detailed illustration is omitted, a mono-tube type and may include magneto-rheological fluid (MRF) as a working fluid. A piston rod is inserted slidably into a cylindrical cylinder filled with MRF in the axial direction, and the inside of the cylinder is divided into an upper oil chamber and a lower oil chamber by a piston attached to the tip end of the piston rod. When an electric current is supplied to the coil located inside the connecting passage that connects the upper and lower oil chambers, a magnetic field is applied to the MRF circulating in the connecting passage, causing ferromagnetic particles to form clusters. This changes the viscosity of the MRF passing through the connecting passage, which can change the damping force of the viscous damping member 250. The viscous damping member 250 is not limited to a mechanism using magneto-viscous fluid (MRF), and may also be a mechanism that adjusts the damping force by changing the amount of oil (hydraulic oil) passing through the orifice by varying the diameter of the orifice using a step motor or the like.

[Configuration of Control Device]

Figure 3:
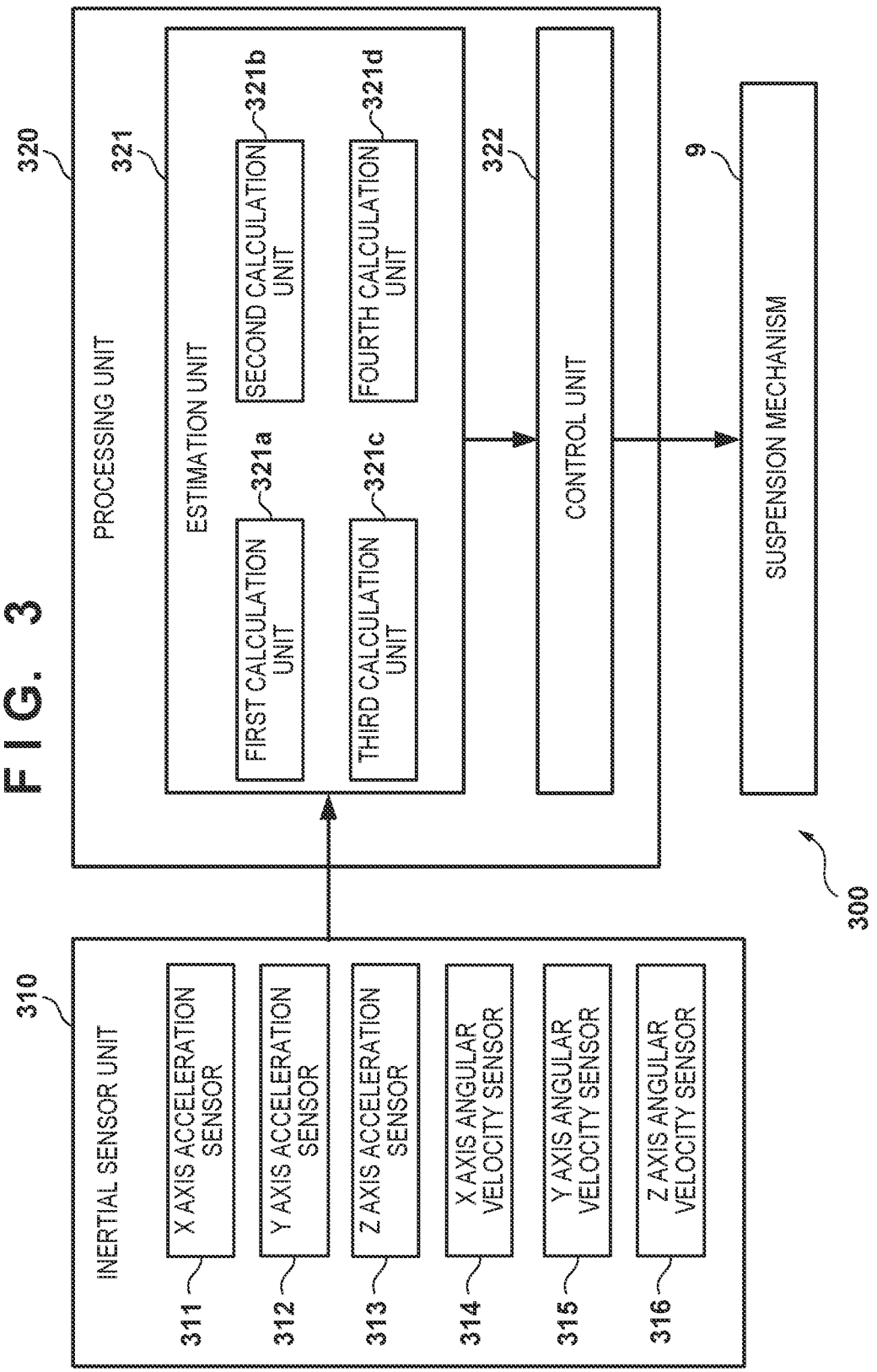
FIG. 3 is a diagram illustrating a configuration example of a control device.

FIG. 3 is a diagram illustrating a configuration example of a control device 300 according to the present embodiment. The control device 300 is a device that controls the vehicle 1 and may include an inertial sensor unit 310 (detector, detection unit) and a processing unit 320.

The inertial sensor unit 310, which is also called an inertial measurement unit (IMU), is capable of detecting the behavior of the vehicle 1 by sensing the acceleration and angular velocity generated in the vehicle 1. The inertial sensor unit 310 may be disposed at any appropriate position of the vehicle 1, such as near the center of gravity of the vehicle 1. The inertial sensor unit 310 of the present embodiment includes an X-axis acceleration sensor 311 that detects translational acceleration (X-axis acceleration) in the X-axis direction (front-and-rear direction of the vehicle 1), a Y-axis acceleration sensor 312 that detects translational acceleration (Y-axis acceleration) in the Y-axis direction (left-and-right direction of the vehicle 1), and a Z-axis acceleration sensor 313 that detects translational acceleration (Z-axis acceleration) in the Z-axis direction (up-and-down direction of vehicle 1) as sensors that detect translational acceleration. The inertial sensor unit 310 also includes an X-axis angular velocity sensor 314 that detects angular velocity in the direction around the X axis (X-axis angular velocity), a Y-axis angular velocity sensor 315 that detects angular velocity in the direction around the Y axis (Y-axis angular velocity), and a Z-axis angular velocity sensor 316 that detects angular velocity in the direction around the Z axis (Z-axis angular velocity) as sensors that detect angular velocity.

The processing unit 320 is, for example, an electronic control unit (ECU), and may include a computer including a processor represented by a CPU, a storage device such as semiconductor memory, and an interface with external devices. An application program for estimating the amount of nose dive of the vehicle 1 (hereinafter referred to as the estimation program) is stored in the storage device (memory) of the processing unit 320, and the processor of the processing unit 320 can read and execute the estimation program stored in the storage device. Here, the estimation program may be stored in a storage medium such as a CD-ROM, DVD, or memory and installed in the processing unit 320 from the storage medium, or it may be downloaded from an external server via a network and installed in the processing unit 320.

In the case of the present embodiment, the processing unit 320 may include an estimation unit 321 and a control unit 322 (controller).

The estimation unit 321 estimates the amount of nose dive of the vehicle 1 based on the detection results in the inertial sensor unit 310 (in particular, the acceleration of the vehicle 1 in the X-axis direction (front-and-rear direction) detected by the X-axis acceleration sensor 311). The estimation unit 321 may include a first calculation unit 321a, a second calculation unit 321b, a third calculation unit 321c, and a fourth calculation unit 321*d*. The first calculation unit 321*a* calculates the braking force generated throughout the vehicle 1 based on the acceleration detected by the X-axis acceleration sensor 311 and the weight of the vehicle 1. The second calculation unit 321*b* calculates the pitch angle (angle of rotation around the Y axis) of the vehicle 1 based on the acceleration detected by the X-axis acceleration sensor 311. The third calculation unit 321*c* calculates the braking force of the front brake FB of the vehicle 1 based on the braking force of the entire vehicle calculated by the first calculation unit 321*a* and the pitch angle of the vehicle 1 calculated by the second calculation unit 321*b*. The fourth calculation unit 321*d* calculates the amount of nose dive of the vehicle 1 based on the braking force of the front brake FB of the vehicle 1 calculated by the third calculation unit 321*c*. Here, the inertial sensor unit 310 (in particular, X-axis acceleration sensor 311) and estimation unit 321 may be understood as constituting an estimation device that estimates the amount of nose dive of the vehicle 1 based on the detected acceleration of the vehicle 1 in the front-and-rear direction.

The control unit 322 controls the attitude of the vehicle 1 (i.e., controls the front suspension mechanism 9 of the vehicle 1) so that the change in attitude of the vehicle 1 during braking of the vehicle 1 is reduced (i.e., the attitude of the vehicle 1 is maintained at the target attitude) based on the amount of nose dive of the vehicle 1 estimated by the estimation unit 321. In the present embodiment, from the viewpoint of improving the ride comfort of the vehicle 1, the control unit 322 performs so-called skyhook control to control the damping force of the vibration reduction mechanism 94 (viscous damping member 250) using skyhook theory, which assumes that the vehicle 1 (for example, vehicle body) is suspended in midair by a virtual line. Specifically, the control unit 322 can control the damping force of the vibration reduction mechanism 94, or perform skyhook control, by supplying an electric current to the coil of the viscous damping member 250 of the vibration reduction mechanism 94 and changing the viscosity of the magnetic fluid inside the viscous damping member 250. When a mechanism that varies the diameter of the orifice through which oil passes is used as the viscous damping member 250, the control unit 322 may control the damping force of the vibration reduction mechanism 94 by varying the diameter of the orifice of the viscous damping member 250, thereby changing the amount of oil passing through the orifice.

[Processing Flow of Processing Unit]

Figure 4:
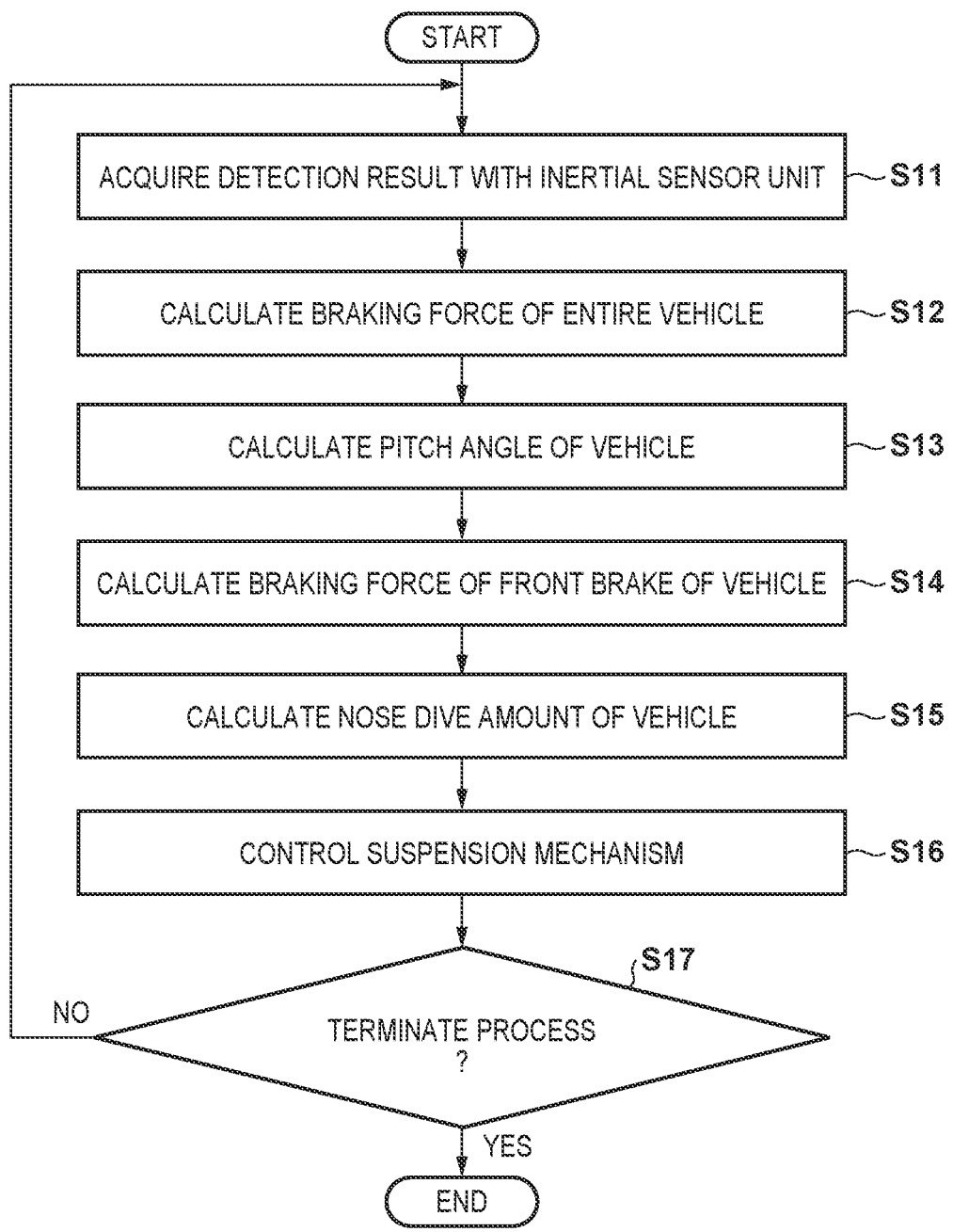
FIG. 4 is a flowchart illustrating a process performed by a processing unit.

Next, the flow of processing performed by the processing unit 320 is described. FIG. 4 is a flowchart illustrating the process performed by the processing unit 320.

In step S11, the processing unit 320 (estimation unit 321) acquires the detection results from the inertial sensor unit 310. The processing unit 320 may acquire information on acceleration and angular velocity detected by the various sensors 311 to 316 in the inertial sensor unit 310, but in particular, it may acquire information on acceleration of the vehicle 1 in the X-axis direction (front-and-rear direction) detected by the X-axis acceleration sensor 311.

In step S12, the processing unit 320 (first calculation unit 321*a*) calculates the braking force of the entire vehicle based on the information acquired in step S11. The braking force of the entire vehicle may be understood as the sum of the braking forces produced by the front and rear brakes in vehicle 1. For example, the processing unit 320 can calculate the braking force of the entire vehicle by multiplying the acceleration of the vehicle 1 in the front-and-rear direction detected by the X-axis acceleration sensor 311 in step S11 by the weight of the vehicle 1. The weight of the vehicle 1 is known information and is stored in advance in the storage device.

In step S13, the processing unit 320 (second calculation unit 321*b*) calculates the pitch angle of the vehicle 1 based on the information acquired in step S11. For example, the processing unit 320 has information indicating the correspondence between the acceleration of the vehicle 1 in the front-and-rear direction and the pitch angle of the vehicle 1 (hereinafter referred to as pitch angle information), and the pitch angle of the vehicle 1 can be calculated from the pitch angle information based on the acceleration of the vehicle 1 in the front-and-rear direction detected by the X-axis acceleration sensor 311. The pitch angle information based on the acceleration of the vehicle 1 in the front-and-rear direction is created in advance by experiments or simulations and stored in a storage device as a table or function.

In step S14, the processing unit 320 (third calculation unit 321*c*) calculates the braking force of the front brake FB of the vehicle 1 based on the braking force of the entire vehicle calculated in step S12 and the pitch angle of the vehicle 1 calculated in step S13. For example, the processing unit 320 has a three-dimensional map indicating the correspondence between the acceleration of the vehicle 1 in the front-and-rear direction, the pitch angle of the vehicle 1, and the distribution of the front and rear brakes of the vehicle 1. From the three-dimensional map, the ratio (%) of the braking force of the front brake FB of the vehicle 1 to the braking force of the entire vehicle can be determined. The braking force of the front brake FB of the vehicle 1 can be calculated by multiplying the obtained ratio (%) by the braking force of the entire vehicle calculated in step S12. The 3D map is created in advance by experiments or simulations and stored in the storage device.

In step S15, the processing unit 320 (fourth calculation unit 321*d*) calculates (estimates) the amount of nose dive of the vehicle 1 based on the braking force of the front brake FB of the vehicle 1 calculated in step S14. For example, in a motorcycle with a common telescopic (registered trademark) pick fork, the processing unit 320 can calculate the amount of compression (stroke) of the front suspension mechanism 9 as the amount of nose dive of the vehicle 1 by multiplying the braking force of the front brake FB of the vehicle 1 calculated in step S14 by the caster angle. Here, the caster angle is defined as the angle between the front fork 95 and the ground (horizontal plane) and is stored in advance in the storage device as known information.

In step S16, the processing unit 320 (control unit 322) controls the attitude of the vehicle 1 based on the amount of nose dive calculated in step S15. For example, the processing unit 320 performs sky hook control by controlling the front suspension mechanism 9 of the vehicle 1 so that the change in attitude of the vehicle 1 during braking of the vehicle 1 is reduced (to maintain the target attitude) based on the amount of nose dive calculated in step S15. This reduces the nose dive of the vehicle 1 during braking of the vehicle 1 and improves the ride comfort of the vehicle 1.

In step S17, the processing unit 320 determines whether to terminate the process. For example, the processing unit 320 can determine to terminate the process when the ignition is turned off by the user (driver). When the processing unit 320 determines not to terminate the process, the process returns to step S11 and repeats steps S11 to S16.

As described above, the control device 300 (estimation device) of the present embodiment estimates the amount of nose dive of the vehicle 1 based on the acceleration in the front-and-rear direction generated in the vehicle 1 during braking of the vehicle 1. This eliminates the need for a sensor to detect the amount of suspension stroke of the vehicle 1 in order to specify the amount of nose dive of the vehicle 1, which can be advantageous in terms of vehicle cost.

Summary of Embodiments

1. The control device according to the above embodiment is a control device (for example, 300) of a vehicle (for example, 1), including:
detection means (for example, 310 and 311) for detecting acceleration in a front-and-rear direction generated in the vehicle; and
an estimation means (for example, 321) for calculating a braking force of the entire vehicle and a pitch angle of the vehicle based on the acceleration detected by the detection means, and estimating an amount of nose dive of the vehicle during braking of the vehicle based on the calculated braking force of the entire vehicle and the calculated pitch angle of the vehicle.

This embodiment eliminates the need for a sensor to detect the amount of suspension stroke of the vehicle 1 in order to specify the amount of nose dive of the vehicle 1, which can be advantageous in terms of vehicle cost.

2. In the above embodiment,
the estimation means includes:
a first calculation means (for example, 321a) that calculates the braking force of the entire vehicle based on the acceleration detected by the detection means and a weight of the vehicle;
a second calculation means (for example, 321b) that calculates the pitch angle of the vehicle based on the acceleration detected by the detection means;
a third calculation means (for example, 321c) that calculates a braking force of a front brake (for example, FB) of the vehicle based on the braking force of the entire vehicle calculated by the first calculation means and the pitch angle of the vehicle calculated by the second calculation means; and
a fourth calculation means (for example, 321d) that calculates the amount of nose dive based on the braking force of the front brake of the vehicle calculated by the third calculation means.

This embodiment allows estimating the amount of nose dive of a vehicle without using a sensor to detect the amount of suspension stroke of the vehicle.

3. In the above embodiment,
the control device further includes a control means (for example, 322) for controlling an attitude of the vehicle based on the amount of nose dive estimated by the estimation means.

This embodiment allows the control of the vehicle's attitude based on an estimate of the amount of nose dive of the vehicle.

4. In the above embodiment,
the control means performs sky hook control based on the amount of nose dive estimated by the estimation means so as to reduce the change in attitude of the vehicle during braking of the vehicle.

This embodiment can improve vehicle ride comfort by controlling the vehicle attitude as skyhook control based on the estimated amount of nose dive of the vehicle.

5. In the above embodiment,
the control means controls a suspension mechanism (for example, 9) of the vehicle based on the amount of nose dive estimated by the estimation means, so as to reduce the change in attitude of the vehicle during braking of the vehicle.

This embodiment can improve the vehicle ride comfort by controlling the attitude of the vehicle by the suspension mechanism based on the estimated amount of nose dive of the vehicle.

6. In the above embodiment,
the vehicle is a straddle type vehicle.

According to this embodiment, in a straddle type vehicle (for example, a motorcycle), unlike a four-wheeled vehicle, the front and rear brakes are not interlocked and the front brake can be applied strongly, making the vehicle susceptible to nose-dive. Therefore, the estimation of the amount of nose dive of a straddle type vehicle can improve the ride comfort of the straddle type vehicle.

The invention is not limited to the foregoing embodiments, and various variations/changes are possible within the spirit of the invention.

What is claimed is:

1. A control device of a vehicle, the control device comprising:
a detector configured to detect an acceleration generated in a front-and-rear direction of the vehicle; and
an estimation unit configured to estimate an amount of nose dive of the vehicle during braking of the vehicle by:
calculating a braking force of an entirety of the vehicle and a pitch angle of the vehicle based on the acceleration detected by the detector,
calculating a braking force of a front brake of the vehicle based on the calculated braking force of the entirety of the vehicle and the calculated pitch angle of the vehicle, and
calculating an estimated amount of nose dive of the vehicle based on the calculated braking force of the front brake and a caster angle of the vehicle,
wherein a suspension mechanism of the vehicle is controlled based on the estimated amount of nose dive calculated to control an attitude of the vehicle during the braking of the vehicle.

2. The control device according to claim 1, wherein the estimation unit comprises:
a first calculation unit configured to calculate the braking force of the entirety of the vehicle based on the acceleration detected by the detector and a weight of the vehicle;
a second calculation unit configured to calculate the pitch angle of the vehicle based on the acceleration detected by the detector;
a third calculation unit configured to calculate the braking force of the front brake of the vehicle based on the braking force of the entirety of the vehicle calculated by the first calculation unit and the pitch angle of the vehicle calculated by the second calculation unit; and
a fourth calculation unit configured to calculate the estimated amount of nose dive of the vehicle based on the braking force of the front brake calculated by the third calculation unit and the caster angle of the vehicle.

3. The control device according to claim 1, further comprising a controller configured to control the suspension mechanism of the vehicle based on the estimated amount of nose dive calculated to control the attitude of the vehicle during the braking of the vehicle.

4. The control device according to claim 3, wherein the controller is configured to control the suspension mechanism of the vehicle by performing sky hook control based on the estimated amount of nose dive calculated by the estimation unit, so as to reduce a change in the attitude of the vehicle during the braking of the vehicle.

5. The control device according to claim 4, wherein the suspension mechanism is a front suspension mechanism of the vehicle, and the controller is configured to perform the sky hook control by controlling the front suspension mechanism of the vehicle based on the estimated amount of nose dive calculated by the estimation unit, so as to reduce the change in the attitude of the vehicle during the braking of the vehicle.

6. The control device according to claim 1, wherein the vehicle is a straddle type vehicle.

7. A vehicle comprising the control device according to claim 1.

8. An estimation method for estimating an amount of nose dive of a vehicle during braking of the vehicle, the method comprising:
    detecting an acceleration of the vehicle in a front-and-rear direction of the vehicle; and
    estimating the amount of nose dive by:
        calculating a braking force of an entirety of the vehicle and a pitch angle of the vehicle based on the detected acceleration,
        calculating a braking force of a front brake of the vehicle based on the calculated braking force of the entirety of the vehicle and the calculated pitch angle of the vehicle, and
        calculating an estimated amount of nose dive of the vehicle based on the calculated braking force of the front brake and a caster angle of the vehicle,
    wherein a suspension mechanism of the vehicle is controlled based on the estimated amount of nose dive calculated to control an attitude of the vehicle during the braking of the vehicle.

9. A non-transitory storage medium storing a program for causing a computer to execute the estimation method according to claim 8.

10. The control device according to claim 1, wherein the estimation unit is configured to calculate the braking force of the front brake from the calculated braking force of the entirety of the vehicle and the calculated pitch angle of the vehicle, based on information indicating a correspondence between the acceleration of the vehicle in the front-and-rear direction, the pitch angle of the vehicle, and a braking force distribution of the front brake and a rear brake of the vehicle.

* * * * *